(12) United States Patent
Moulton et al.

(10) Patent No.: US 7,062,648 B2
(45) Date of Patent: Jun. 13, 2006

(54) SYSTEM AND METHOD FOR REDUNDANT ARRAY NETWORK STORAGE

(75) Inventors: Gregory Hagan Moulton, Irvine, CA (US); James John Zarbock, El Toro, CA (US)

(73) Assignee: Avamar Technologies, Inc., Irvine, CA (US)

( * ) Notice: Subject to any disclaimer, the term of this patent is extended or adjusted under 35 U.S.C. 154(b) by 1056 days.

(21) Appl. No.: 09/777,139

(22) Filed: Feb. 5, 2001

(65) Prior Publication Data

US 2001/0042221 A1  Nov. 15, 2001

Related U.S. Application Data

(60) Provisional application No. 60/245,920, filed on Nov. 6, 2000, provisional application No. 60/183,762, filed on Feb. 18, 2000.

(51) Int. Cl.
*H04L 9/00* (2006.01)

(52) U.S. Cl. ............................. 713/153; 726/1; 726/6

(58) Field of Classification Search ............... 713/200, 713/201, 153; 709/229
See application file for complete search history.

(56) References Cited

U.S. PATENT DOCUMENTS

| 3,668,647 A | 6/1972 | Evangelisti et al. ..... 340/172.5 |
|---|---|---|
| 4,215,402 A | 7/1980 | Mitchell et al. ............. 364/200 |
| 4,649,479 A | 3/1987 | Advani et al. .............. 364/300 |
| 4,761,785 A | 8/1988 | Clark et al. ..................... 371/51 |
| 4,887,204 A | 12/1989 | Johnson et al. ............. 364/200 |
| 4,887,235 A | 12/1989 | Holloway et al. ........... 364/900 |
| 4,897,781 A | 1/1990 | Chang et al. ................ 364/200 |
| 4,901,223 A | 2/1990 | Rhyne .......................... 364/200 |
| 4,982,324 A | 1/1991 | McConaughy et al. ..... 364/200 |
| 5,005,122 A | 4/1991 | Griffin et al. ................ 364/200 |
| 5,018,060 A | 5/1991 | Gelb et al. .................... 364/200 |
| 5,089,958 A | 2/1992 | Horton et al. ............... 395/575 |
| 5,109,515 A | 4/1992 | Laggis et al. ................ 395/725 |
| 5,133,065 A | 7/1992 | Cheffetz et al. ............. 395/575 |
| 5,146,568 A | 9/1992 | Flaherty et al. .............. 395/325 |
| 5,155,835 A | 10/1992 | Belsan ......................... 395/425 |
| 5,162,986 A | 11/1992 | Graber et al. ................ 364/146 |
| 5,163,148 A | 11/1992 | Walls .......................... 395/600 |
| 5,210,866 A | 5/1993 | Milligan et al. ............. 395/575 |
| 5,218,695 A | 6/1993 | Noveck et al. .............. 395/600 |
| 5,239,637 A | 8/1993 | Davis et al. ................. 395/425 |
| 5,239,647 A | 8/1993 | Anglin et al. ................ 395/600 |
| 5,239,659 A | 8/1993 | Rudeseal et al. ............ 395/800 |
| 5,263,154 A | 11/1993 | Eastridge et al. ............ 395/575 |
| 5,276,860 A | 1/1994 | Fortier et al. ................ 395/575 |
| 5,276,867 A | 1/1994 | Kenley et al. ............... 395/600 |
| 5,305,389 A | 4/1994 | Palmer ............................ 382/1 |
| 5,317,728 A | 5/1994 | Tevis et al. .................. 395/600 |

(Continued)

OTHER PUBLICATIONS

Tridgell, Andrew, Efficient Algorithms for Sorting and Synchronization, Apr. 2000, pp. i-viii, pp. 1-106.

*Primary Examiner*—Kambiz Zand
(74) *Attorney, Agent, or Firm*—Kent A. Lembke; William J. Kubida; Hogan & Hartson LLP (57) ABSTRACT

A data storage system comprising a plurality of storage nodes. Data storage mechanisms are implemented in each storage node communicating a storage request to at least one storage node. The at least one storage node implements the storage request using an arbitrary subset of the storage nodes.

30 Claims, 4 Drawing Sheets

U.S. PATENT DOCUMENTS

| | | | |
|---|---|---|---|
| 5,325,505 A | 6/1994 | Hoffecker et al. | 395/425 |
| 5,347,653 A | 9/1994 | Flynn et al. | 395/600 |
| 5,355,453 A | 10/1994 | Row et al. | 395/200 |
| 5,367,637 A | 11/1994 | Wei | 395/250 |
| 5,367,698 A | 11/1994 | Webber et al. | 395/800 |
| 5,379,418 A | 1/1995 | Shimazaki et al. | 395/575 |
| 5,403,639 A | 4/1995 | Belsan et al. | 395/600 |
| 5,404,508 A | 4/1995 | Konrad et al. | 395/600 |
| 5,404,527 A | 4/1995 | Irwin et al. | 395/700 |
| 5,448,718 A | 9/1995 | Cohn et al. | 395/404 |
| 5,452,440 A | 9/1995 | Salsburg | 395/463 |
| 5,452,454 A | 9/1995 | Basu | 395/700 |
| 5,454,099 A | 9/1995 | Myers et al. | 395/575 |
| 5,479,654 A | 12/1995 | Squibb | 395/600 |
| 5,487,160 A | 1/1996 | Bemis | 395/441 |
| 5,497,483 A | 3/1996 | Beardsley et al. | 395/575 |
| 5,513,314 A | 4/1996 | Kandasamy et al. | 395/182.04 |
| 5,515,502 A | 5/1996 | Wood | 395/182.13 |
| 5,524,205 A | 6/1996 | Lomet et al. | 395/182.14 |
| 5,535,407 A | 7/1996 | Yanagawa et al. | 395/800 |
| 5,544,320 A | 8/1996 | Konrad | 395/200.09 |
| 5,559,991 A | 9/1996 | Kanfi | 395/489 |
| 5,574,906 A | 11/1996 | Morris | 395/601 |
| 5,586,322 A | 12/1996 | Beck et al. | 396/616 |
| 5,604,862 A | 2/1997 | Midgely et al. | 395/182.04 |
| 5,606,719 A | 2/1997 | Nichols et al. | 395/876 |
| 5,640,561 A | 6/1997 | Satoh et al. | 395/618 |
| 5,649,196 A | 7/1997 | Woodhill et al. | 395/620 |
| 5,659,743 A | 8/1997 | Adams et al. | 395/621 |
| 5,659,747 A | 8/1997 | Nakajima | 395/651 |
| 5,689,678 A * | 11/1997 | Stallmo et al. | 711/114 |
| 5,696,901 A | 12/1997 | Konrad | 395/200.09 |
| 5,751,936 A | 5/1998 | Larson et al. | 395/182.05 |
| 5,754,844 A | 5/1998 | Fuller | 395/606 |
| 5,765,173 A | 6/1998 | Cane et al. | 707/204 |
| 5,771,354 A | 6/1998 | Crawford | 395/200.59 |
| 5,778,395 A | 7/1998 | Whiting et al. | 707/204 |
| 5,794,254 A | 8/1998 | McClain | 707/204 |
| 5,802,264 A | 9/1998 | Chen et al. | 395/182.04 |
| 5,802,297 A | 9/1998 | Engquist | 395/200.42 |
| 5,805,804 A * | 9/1998 | Laursen et al. | 709/223 |
| 5,826,001 A * | 10/1998 | Lubbers et al. | 714/6 |
| 5,870,474 A * | 2/1999 | Wasilewski et al. | 380/211 |
| 5,933,592 A * | 8/1999 | Lubbers et al. | 714/6 |
| 5,974,506 A * | 10/1999 | Sicola et al. | 711/120 |
| 5,978,791 A | 11/1999 | Farber et al. | 707/2 |
| 6,000,020 A | 12/1999 | Chin et al. | 711/162 |
| 6,014,676 A | 1/2000 | McClain | 707/204 |
| 6,016,553 A | 1/2000 | Schneider et al. | 714/21 |
| 6,029,168 A | 2/2000 | Frey | 707/10 |
| 6,065,008 A * | 5/2000 | Simon et al. | 707/10 |
| 6,085,298 A | 7/2000 | Ohran | 711/162 |
| 6,122,754 A | 9/2000 | Litwin et al. | 714/4 |
| 6,307,487 B1 | 10/2001 | Luby | |
| 6,320,520 B1 | 11/2001 | Luby | |
| 6,356,979 B1 * | 3/2002 | Sicola et al. | 711/114 |
| 6,393,473 B1 * | 5/2002 | Chu | 709/223 |
| 6,643,795 B1 * | 11/2003 | Sicola et al. | 714/6 |
| 6,654,831 B1 * | 11/2003 | Otterness et al. | 710/74 |
| 6,754,181 B1 * | 6/2004 | Elliott et al. | 370/252 |
| 6,760,330 B1 * | 7/2004 | Tahan | 370/389 |
| 6,779,030 B1 * | 8/2004 | Dugan et al. | 709/223 |
| 6,839,827 B1 * | 1/2005 | Beardsley et al. | 711/206 |
| 2002/0035667 A1 * | 3/2002 | Bruning et al. | 711/114 |

\* cited by examiner

SYSTEM AND METHOD FOR REDUNDANT ARRAY NETWORK STORAGE

CROSS-REFERENCE TO RELATED APPLICATIONS

This application claims the benefit of U.S. Provisional Application No. 60/183,762, filed Feb. 18, 2000 and U.S. Provisional Application No. 60/245,920, filed Nov. 6, 2000.

BACKGROUND OF THE INVENTION

1. Field of the Invention

The present invention relates, in general, to network data storage, and, more particularly, to software, systems and methods for high availability, high reliability data storage resident at nodes distributed throughout a network topology.

2. Relevant Background

Economic, political, and social power are increasingly managed by data. Transactions and wealth are represented by data. Political power is analyzed and modified based on data. Human interactions and relationships are defined by data exchanges. Hence, the efficient distribution, storage, and management of data is expected to play an increasingly vital role in human society.

The quantity of data that must be managed, in the form of computer programs, databases, files, and the like, increases exponentially. As computer processing power increases, operating system and application software becomes larger. Moreover, the desire to access larger data sets such as those comprising multimedia files and large databases further increases the quantity of data that is managed. This increasingly large data load must be transported between computing devices and stored in an accessible fashion. The exponential growth rate of data is expected to outpace improvements in communication bandwidth and storage capacity, making the need to handle data management tasks using conventional methods even more urgent.

Many factors must be balanced and often compromised in conventional data storage systems. Because the quantity of data stored is large and rapidly increasing, there is continuing pressure to reduce cost per bit of storage. Also, data management systems should be sufficiently scaleable to contemplate not only current needs, but future needs as well. Preferably, storage systems are designed to be incrementally scaleable so that a user can purchase only the capacity needed at any particular time. High reliability and high availability are also considered as data users become increasingly intolerant of lost, damaged, and unavailable data. Unfortunately, conventional data management architectures must compromise these factors—no single data architecture provides a cost-effective, highly reliable, highly available, and dynamically scaleable solution.

Conventional RAID (redundant array of independent disks) systems provide a way to store the same data in different places (thus, redundantly) on multiple storage devices such as hard disks. By placing data on multiple disks, input/output (I/O) operations can overlap in a balanced way, improving performance. Since using multiple disks increases the mean time between failure (MTBF) for the system as a whole, storing data redundantly also increases fault-tolerance. A RAID system relies on a hardware or software controller to hide the complexities of the actual data management so that a RAID systems appear to an operating system to be a single logical hard disk. However, RAID systems are difficult to scale because of physical limitations on the cabling and controllers. Also, RAID systems are highly dependent on the controllers so that when a controller fails, the data stored behind the controller becomes unavailable. Moreover, RAID systems require specialized, rather than commodity hardware, and so tend to be expensive solutions.

RAID solutions are also relatively expensive to maintain. RAID systems are designed to enable recreation of data on a failed disk or controller but the failed disk must be replaced to restore high availability and high reliability functionality. Until replacement occurs, the system is vulnerable to additional device failures. Condition of the system hardware must be continually monitored and maintenance performed as needed to maintain functionality. Hence, RAID systems must be physically situated so that they are accessible to trained technicians who can perform the maintenance. This limitation makes it difficult to set up a RAID system at a remote location or in a foreign country where suitable technicians would have to be found and/or transported to the RAID equipment to perform maintenance functions.

NAS (network-attached storage) refers to hard disk storage that is set up with its own network address rather than being attached to an application server. File requests are mapped to the NAS file server. NAS may perform I/O operations using RAID internally (i.e., within a NAS node). NAS may also automate mirroring of data to one or more other NAS devices to further improve fault tolerance. Because NAS devices can be added to a network, they may enable some scaling of the capacity of the storage systems by adding additional NAS nodes. However, NAS devices are constrained in RAID applications to the abilities of conventional RAID controllers. NAS systems do not generally enable mirroring and parity across nodes, and so a single point of failure at a typical NAS node makes all of the data stored at that NAS node unavailable.

Traditional storage systems, from basic disk-based storage to more complex RAID-type storage, view storage as one or more hardware storage devices under control of a centralized controller. Even in distributed storage systems, all that is distributed is the data—the functionality that implements management and control features tends to be centralized. In such systems data availability is compromised when the centralized controller fails or becomes unavailable for any reason. Moreover, such systems are compromised when network links to the central controller fail or become congested. A need exists for a robust storage architecture that improves immunity to all single points of failure in front of data availability.

Philosophically, the way data is conventionally managed is inconsistent with the hardware devices and infrastructures that have been developed to manipulate and transport data. For example, computers are characteristically general-purpose machines that are readily programmed to perform a virtually unlimited variety of functions. In large part, however, computers are loaded with a fixed, slowly changing set of data that limits their general-purpose nature to make the machines special-purpose. Advances in processing speed, peripheral performance and data storage capacity are most dramatic in commodity computers and computer components. Yet many data storage solutions cannot take advantage of these advances because they are constrained rather than extended by the storage controllers upon which they are based. Similarly, the Internet was developed as a fault tolerant, multi-path interconnection. However, network resources are conventionally implemented in specific network nodes such that failure of the node makes the resource unavailable despite the fault-tolerance of the network to which the node is connected. Continuing needs exist for highly available, highly reliable, and highly scaleable data storage solutions.

SUMMARY OF THE INVENTION

Briefly stated, the present invention involves a data storage system comprising a plurality of storage nodes. Data storage mechanisms are implemented in each storage node. A communication medium links storage nodes. A quantity of data is distributed across a selected set of the storage nodes such that the quantity of data remains available irrespective of the unavailability of one or more of the storage nodes within the selected set.

The plurality of network storage nodes are configured as a redundant array of inexpensive nodes (RAIN) system in which each node comprises central processor, network interface, memory, and one or more mass storage devices. The storage nodes are connected to an internal network or data bus. Nodes can be added and removed from the system without making the system or data stored in the system unavailable to an externally connected device or network. The system does not have the single points of failure often characteristic of conventional data storage systems.

In another aspect, the present invention involves a method of managing data storage in a network comprising multiple storage nodes. When a storage request is communicated to at least one storage node the at least one storage node is caused to implement the storage request using an arbitrary subset of the available storage nodes. State information is communicated between the multiple storage nodes and used to select the arbitrary subset of the multiple storage nodes.

DETAILED DESCRIPTION OF THE PREFERRED EMBODIMENTS

The present invention is directed to a high availability, high reliability storage system that leverages rapid advances in commodity computing devices and the robust nature of internetwork technology such as the Internet. In general, the present invention involves a redundant array of inexpensive nodes (RAIN) distributed throughout a network topology. Nodes may be located on local area networks (LANs), metropolitan area network (MAN), wide area networks (WANs), or any other network having spatially distanced nodes. Nodes are preferably internetworked using mechanisms such as the Internet. In specific embodiments, at least some nodes are publicly accessible through public networks such as the Internet and the nodes communicate with each other by way of private networks and/or virtual private networks, which may themselves be implemented using Internet resources.

Significantly, the nodes implement not only storage, but sufficient intelligence to communicate with each other and manage not only their own storage, but storage on other nodes. For example, storage nodes maintain state information describing other storage nodes capabilities, connectivity, capacity, and the like. Also, storage nodes may be enabled to cause storage functions such as read/write functions to be performed on other storage nodes. Traditional storage systems do not allow peer-to-peer type information sharing amongst the storage devices themselves. In contrast, the present invention enables peer-to-peer information exchange and, as a result, implements a significantly more robust system that is highly scaleable. The system is scaleable because, among other reasons, many storage tasks can be implemented in parallel by multiple storage devices. The system is robust because the storage nodes can be globally distributed making the system immune to events in any one or more geographical, political, or network topological location.

The present invention is implemented in a globally distributed storage system involving storage nodes that are optionally managed by distributed storage allocation management (SAM) processes. The present invention is directed to the architecture and implementation of the storage nodes themselves, and so is not limited to use with the SAM processes. However, the exemplary SAM processes are discussed to the extent they illustrate the performance of the storage node architecture of the present invention.

The nodes are connected to a network and data is preferably distributed to the nodes in a multi-level, fault-tolerant fashion. In contrast to conventional RAID systems, the present invention enables mirroring and parity operations to be spread across nodes rather than simply across hard drives within a single node. Nodes can be dynamically added to and removed from the system while the data managed by the system remains available. In this manner, the system of the present invention avoids single or multiple failure points in a manner that is orders of magnitude more robust than conventional RAID systems.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

Figure 1:
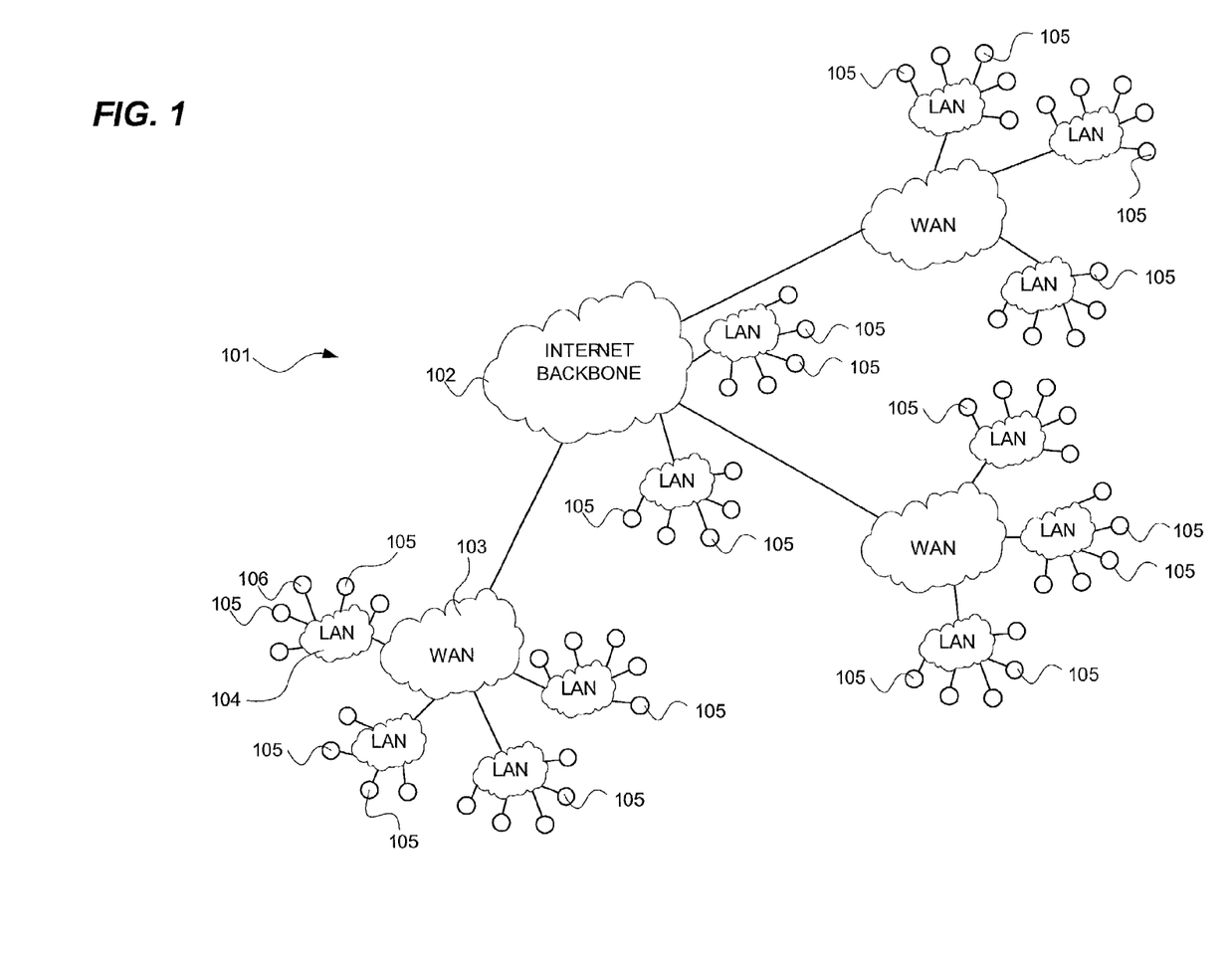
FIG. 1 shows a networked computer environment in which the present invention is implemented.

The present invention is directed to data storage on a network 101 shown in FIG. 1. FIG. 1 shows an exemplary internetwork environment 101 such as the Internet. The Internet is a global internetwork formed by logical and physical connections between multiple wide area networks (WANs) 103 and local area networks (LANs) 104. An Internet backbone 102 represents the main lines and routers that carry the bulk of the traffic. The backbone is formed by the largest networks in the system that are operated by major Internet service providers (ISPs) such as GTE, MCI, Sprint, UUNet, and America Online, for example. While single connection lines are used to conveniently illustrate WAN 103 and LAN 104 connections to the Internet backbone 102, it should be understood that in reality multi-path, routable wired and/or wireless connections exist between multiple WANs 103 and LANs 104. This makes internetwork 101 robust when faced with single or multiple failure points.

It is important to distinguish network connections from internal data pathways implemented between peripheral devices within a computer. A "network" comprises a system of general purpose, usually switched, physical connections that enable logical connections between processes operating on nodes 105. The physical connections implemented by a network are typically independent of the logical connections that are established between processes using the network. In this manner, a heterogeneous set of processes ranging from file transfer, mail transfer, and the like can use the same physical network. Conversely, the network can be formed from a heterogeneous set of physical network technologies that are invisible to the logically connected processes using the network. Because the logical connection between processes implemented by a network is independent of the physical connection, internetworks are readily scaled to a virtually unlimited number of nodes over long distances.

In contrast, internal data pathways such as a system bus, Peripheral Component Interconnect (PCI) bus, Intelligent Drive Electronics (IDE) bus, Small Computer System Interface (SCSI) bus, Fibre Channel, and the like define physical connections that implement special-purpose connections within a computer system. These connections implement physical connections between physical devices as opposed to logical connections between processes. These physical connections are characterized by limited distance between components, limited number of devices that can be coupled to the connection, and constrained format of devices that can be connected over the connection.

To generalize the above discussion, the term "network" as it is used herein refers to a means enabling a physical and logical connection between devices that 1) enables at least some of the devices to communicate with external sources, and 2) enables the devices to communicate with each other. It is contemplated that some of the internal data pathways described above could be modified to implement the peer-to-peer style communication of the present invention, however, such functionality is not currently available in commodity components. Moreover, such modification, while useful, would fail to realize the full potential of the present invention as storage nodes implemented across, for example, a SCSI bus would inherently lack the level of physical and topological diversity that can be achieved with the present invention.

Referring again to FIG. 1, the present invention is implemented by placing storage devices at nodes 105. The storage at any node 105 may comprise a single hard drive, may comprise a managed storage system such as a conventional RAID device having multiple hard drives configured as a single logical volume, or may comprise any reasonable hardware configuration spanned by these possibilities. Significantly, the present invention manages redundancy operations across nodes, as opposed to within nodes, so that the specific configuration of the storage within any given node can be varied significantly without departing from the present invention.

Optionally, one or more nodes such as nodes 106 implement storage allocation management (SAM) processes that manage data storage across multiple nodes 105 in a distributed, collaborative fashion. SAM processes may be implemented in a centralized fashion within special-purpose nodes 106. Alternatively, SAM processes are implemented within some or all of RAIN nodes 105. The SAM processes communicate with each other and handle access to the actual storage devices within any particular RAIN node 105. The capabilities, distribution, and connections provided by the RAIN nodes 105 in accordance with the present invention enable storage processes (e.g., SAM processes) to operate with little or no centralized control for the system as whole.

In a particular implementation, SAM processes provide data distribution across nodes 105 and implement recovery in a fault-tolerant fashion across network nodes 105 in a manner similar to paradigms found in PAID storage subsystems. However, because SAM processes operate across nodes rather than within a single node or within a single computer, they allow for greater levels of fault tolerance and storage efficiency than those that may be achieved using conventional PAID systems. Moreover, it is not simply that the SAM processes operate across network nodes, but also that SAM processes are themselves distributed in a highly parallel and redundant manner, especially when implemented within some or all of the nodes 105. By way of this distribution of functionality as well as data, failure of any node or group of nodes will be much less likely to affect the overall availability of stored data.

For example, SAM processes can recover even when a network node 105, LAN 104, or WAN 103 becomes unavailable. Moreover, even when a portion of the Internet backbone 102 becomes unavailable through failure or congestion the SAM processes can recover using data distributed on nodes 105 and functionality that is distributed on the various SAM nodes 106 that remain accessible. In this manner, the present invention leverages the robust nature of internetworks to provide unprecedented availability, reliability, and robustness.

Figure 2:
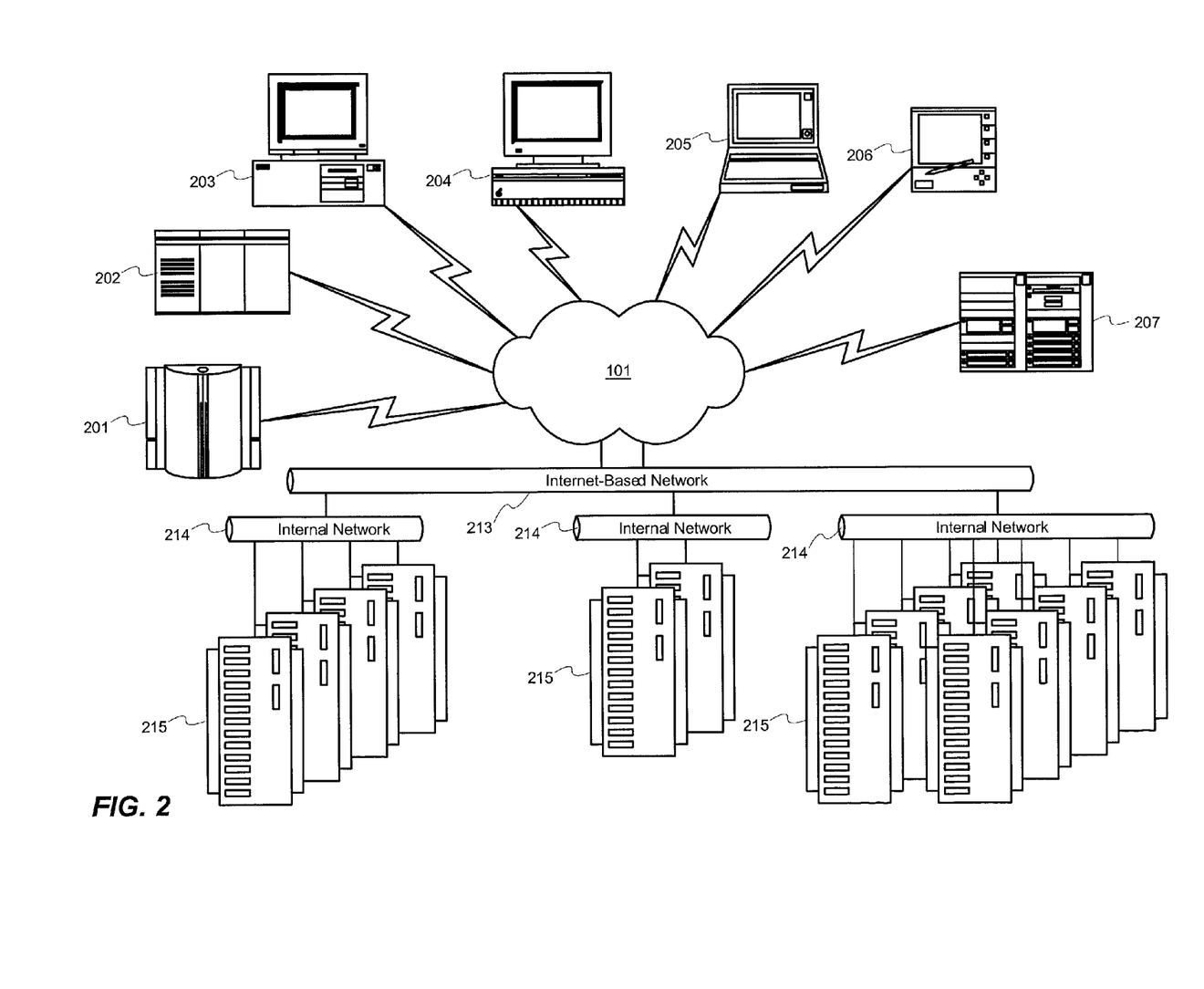
FIG. 2 shows a computing environment in which the present invention is implemented at a different level of detail.

FIG. 2 shows an alternate view of an exemplary network computing environment in which the present invention is implemented. Internetwork 101 enables the interconnection of a heterogeneous set of computing devices and mechanisms ranging from a supercomputer or data center 201 to a hand-held or pen-based device 206. While such devices have disparate data storage needs, they share an ability to retrieve data via network 101 and operate on that data using their own resources. Disparate computing devices including mainframe computers (e.g., VAX station 202 and IBM AS/400 station 208) as well as personal computer or workstation class devices such as IBM compatible device 203, Macintosh device 204 and laptop computer 205 are easily interconnected via internetwork 101. The present invention also contemplates wireless device connections to devices such as cell phones, laptop computers, pagers, hand held computers, and the like.

Internet-based network 213 comprises a set of logical connections, some of which are made through internetwork 101, between a plurality of internal networks 214. Conceptually, Internet-based network 213 is akin to a WAN 103 in that it enables logical connections between spatially distant nodes. Internet-based networks 213 may be implemented using the Internet or other public and private WAN technologies including leased lines, Fibre Channel, frame relay, and the like.

Similarly, internal networks 214 are conceptually akin to LANs 104 shown in FIG. 1 in that they enable logical connections across more limited distances than those allowed by a WAN 103. Internal networks 214 may be implemented using LAN technologies including Ethernet, Fiber Distributed Data Interface (FDDI), Token Ring, Appletalk, Fibre Channel, and the like.

Each internal network 214 connects one or more RAIN elements 215 to implement RAIN nodes 105. RAIN elements 215 illustrate an exemplary instance of hardware/software platform that implements a RAIN node 105. Conversely, a RAIN node 105 refers to a more abstract logical entity that illustrates the presence of the RAIN functionality to external network users. Each RAIN element 215 comprises a processor, memory, and one or more mass storage devices such as hard disks. RAIN elements 215 also include hard disk controllers that may be conventional EIDE or SCSI controllers, or may be managing controllers such as RAID controllers. RAIN elements 215 may be physically dispersed or co-located in one or more racks sharing resources such as cooling and power. Each node 105 is independent of other nodes 105 in that failure or unavailability of one node 105 does not affect availability of other nodes 105, and data stored on one node 105 may be reconstructed from data stored on other nodes 105.

The perspective provided by FIG. 2 is highly physical and it should be kept in mind that physical implementation of the present invention may take a variety of forms. The multi-tiered network structure of FIG. 2 may be altered to a single tier in which all RAIN nodes 105 communicate directly with the Internet. Alternatively, three or more network tiers may be present with RAIN nodes 105 clustered behind any given tier. A significant feature of the present invention is that it is readily adaptable to these heterogeneous implementations.

Figure 3:
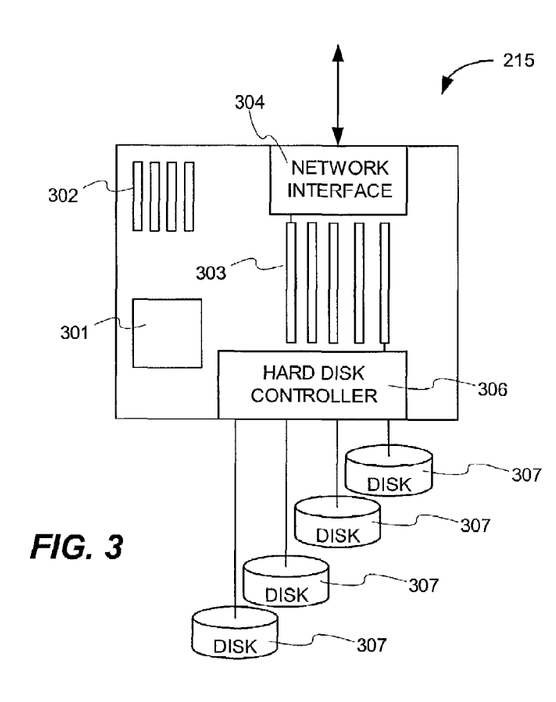
FIG. 3 illustrates components of a RAIN element in accordance with an embodiment of the present invention.

RAIN elements 215 are shown in greater detail in FIG. 3. In a particular implementation, RAIN elements 215 comprise computers using commodity components such as Intel-based microprocessors 301 mounted on a motherboard supporting a PCI bus 303 and 128 megabytes of random access memory (RAM) 302 housed in a conventional AT or ATX case. SCSI or IDE controllers 306 may be implemented on the motherboard and/or by expansion cards connected to the PCI bus 303. Where the controllers 306 are implemented only on the motherboard, a PCI expansion bus 303 is optional. In a particular implementation, the motherboard implements two mastering EIDE channels and an PCI expansion card is used to implement two additional mastering EIDE channels so that each RAIN element 215 includes up to four EIDE hard disks 307. In the particular implementation, each hard disk 307 comprises an 80 gigabyte hard disk for a total storage capacity of 320 gigabyte per RAIN element 215. The casing also houses supporting mechanisms such as power supplies and cooling devices (not shown).

The specific implementation discussed above is readily modified to meet the needs of a particular application. Because the present invention uses network methods to communicate with the storage nodes, the particular implementation of the storage node is largely hidden from the devices using the storage nodes, making the present invention uniquely receptive to modification of node configuration and highly tolerant of systems comprised by heterogeneous storage node configurations. For example, processor type, speed, instruction set architecture, and the like can be modified and may vary from node to node. The hard disk capacity and configuration within RAIN elements 215 can be readily increased or decreased to meet the needs of a particular application. Although mass storage is implemented using magnetic hard disks, other types of mass storage devices such as magneto-optical, optical disk, digital optical tape, holographic storage, atomic force probe storage and the like can be used as suitable equivalents as they become increasingly available. Memory configurations including RAM capacity, RAM speed, RAM type (e.g., DRAM, SRAM, SDRAM) can vary from node to node making the present invention incrementally upgradeable to take advantage of new technologies and component pricing. Network interface components may be provided in the form of expansion cards coupled to a mother board or built into a mother board and may operate with a variety of available interface speeds (e.g., 10 BaseT Ethernet, 100 BaseT Ethernet, Gigabit Ethernet, 56K analog modem) and can provide varying levels of buffering, protocol stack processing, and the like.

Specifically, it is contemplated that the processing power, memory, network connectivity and other features of the implementation shown in FIG. 3 could be integrated within a disk drive controller and actually integrated within the housing of a disk drive itself. In such a configuration, a RAIN element 215 might be deployed simply by connecting such an integrated device to an available network, and multiple RAIN elements 215 might be housed in a single physical enclosure.

Each RAIN element 215 may execute an operating system. The particular implementations use a UNIX operating system (OS) or UNIX-variant OS such as Linux. It is contemplated, however, that other operating systems including DOS, Microsoft Windows, Apple Macintosh OS, OS/2, Microsoft Windows NT and the like may be equivalently substituted with predictable changes in performance. Moreover, special purpose lightweight operating systems or micro kernels may also be used, although cost of development of such operating systems may be prohibitive. The operating system chosen implements a platform for executing application software and processes, mechanisms for accessing a network, and mechanisms for accessing mass storage. Optionally, the OS supports a storage allocation system for the mass storage via the hard disk controller(s).

Various application software and processes can be implemented on each RAIN element 215 to provide network connectivity via a network interface 304 using appropriate network protocols such as User Datagram Protocol (UDP), Transmission Control Protocol (TCP), Internet Protocol (IP), Token Ring, Asynchronous Transfer Mode (ATM), and the like.

In the particular embodiments, the data stored in any particular node 105 can be recovered using data at one or more other nodes 105 using data recovery and storage management processes. These data recovery and storage management processes preferably execute on a node 106 and/or on one of the nodes 105 separate from the particular node 105 upon which the data is stored. Conceptually, storage management is provided across an arbitrary set of nodes 105 that may be coupled to separate, independent internal networks 215 via internetwork 213. This increases availability and reliability in that one or more internal networks 214 can fail or become unavailable due to congestion or other events without affecting the overall availability of data.

In an elemental form, each RAIN element 215 has some superficial similarity to a network attached storage (NAS) device. However, because the RAIN elements 215 work cooperatively, the functionality of a RAIN system comprising multiple cooperating RAIN elements 215 is significantly greater than a conventional NAS device. Further, each RAIN element preferably supports data structures that enable parity operations across nodes 105 (as opposed to within nodes 105). These data structures enable operation akin to RAID operation, however, because the RAIN operations are distributed across nodes and the nodes are logically, but not necessarily physically connected, the RAIN operations are significantly more fault tolerant and reliable than conventional RAID systems.

Figure 4:
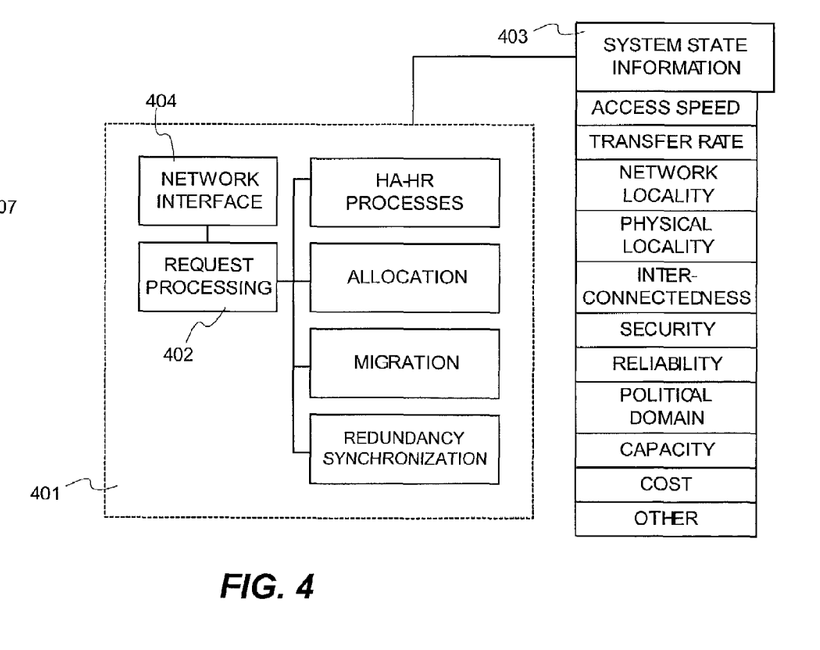
FIG. 4 and FIG. 5 show exemplary organizations of the RAIN elements into a redundant array storage system.

FIG. 4 illustrates an exemplary storage allocation management system including SAM processes 401 that provides an exemplary mechanism for managing storage held in RAIN nodes 105. SAM processes may vary in complexity and implementation to meet the needs of a particular application. SAM processes 401 may vary in complexity from relatively simple file system type processes to more complex redundant array storage processes involving multiple RAIN nodes 105. SAM processes may be provided within a storage-using client, within a separate network node 106, or within some or all of RAIN nodes 105. In a basic form, SAM processes 401 implements a network interface 404 to communicate with, for example, network 101, processes to exchange state information with other storage nodes 105 and store the state information in a state information data structure 402, and to read and write data on other storage nodes 105. These basic functions enable a plurality of storage nodes 105 to coordinate their actions to implement a virtual storage substrate layer upon which more complex SAM processes can be implemented.

In a more complex form, contemplated SAM processes 401 comprise a plurality of SAM processes that provide a set of functions for managing storage held in multiple RAIN nodes 105 and are used to coordinate, facilitate, and manage participating nodes 105 in a collective manner. This coordination enables the underlying configuration, location, cost, and other individual characteristics of each node 105 to be optionally hidden from client programs using the SAM processes 401. In this manner, SAM processes 401 may realize benefits in the form of greater access speeds, distributed high speed data processing, increased security, greater storage capacity, lower storage cost, increased reliability and availability, decreased administrative costs, and the like.

In the particular example of FIG. 4, SAM processes are conveniently implemented as network-connected servers that receive storage requests from a network-attached file system. Network interface processes 404 may implement a first interface for receiving storage requests from a public network such as the Internet. In addition, network interface may implement a second interface for communicating with other storage nodes 105. The second interface may be, for example, a virtual private network. For convenience, a server implementing SAM processes is referred to as a SAM node 106, however, it should be understood from the above discussion that a SAM node 106 may in actuality be physically implemented on the same machine as a client or RAIN node 105. An initial request can be directed at any server implementing SAM processes, or the file system may be reconfigured to direct the access request at a particular SAM node 106. When the initial server does not does not respond, the access request is desirably redirected to one or more alternative SAM nodes 106 and/or RAIN nodes 105 implementing SAM processes.

Storage request processing involves implementation of an interface or protocol that is used for requesting services or servicing requests between nodes or between SAM processes and clients of SAM processes. This protocol can be between SAM processes executing on a single node, but is more commonly between nodes running over a network, typically the Internet. Requests indicate, for example, the type and size of data to be stored, characteristic frequency of read and write access, constraints of physical or topological locality, cost constraints, and similar data that taken together characterize desired data storage performance characteristics.

Storage requests are handled by storage request processes 402 which operate to generate read/write commands in view of system state information 403. Storage request processes include processing requests for storage access, identification and allocation/de-allocation of storage capacity, migration of data between storage nodes 105, redundancy synchronization between redundant data copies, and the like. SAM processes 401 preferably abstract or hide the underlying configuration, location, cost, and other context information of each RAIN node 105 from data users. SAM processes also enable a degree of fault tolerance that is greater than any storage node in isolation as parity is spread out in a configurable manner across multiple storage nodes that are geographically, politically, and network topologically dispersed.

Figure 5:
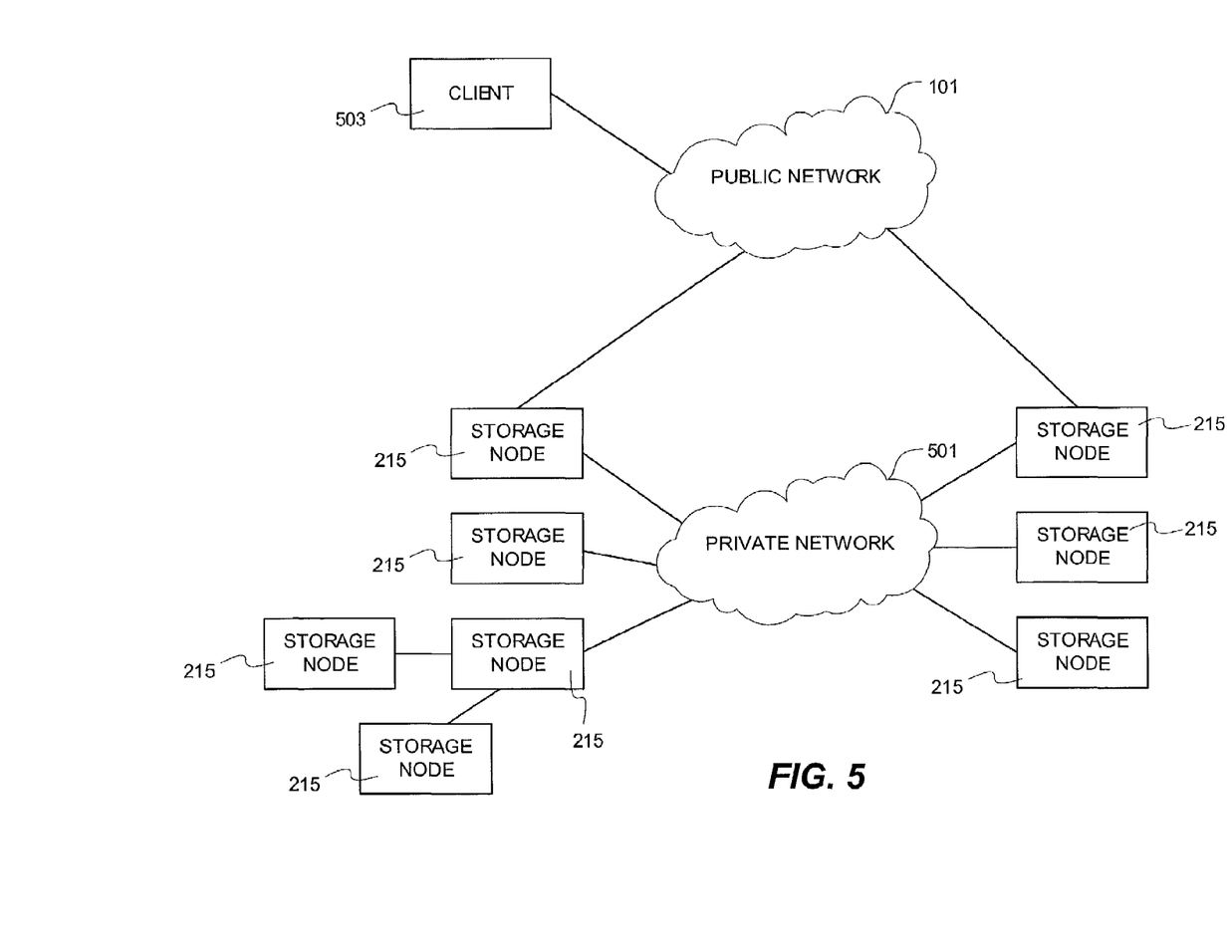

FIG. 5 shows an exemplary storage system in accordance with the present invention from another perspective. Client 503 represents any of a number of network appliances that may use the storage system in accordance with the present invention. Client 503 uses a file system or other means for generating storage requests directed to one of accessible storage nodes 215. Not all storage nodes 215 need to be accessible through Internet 101. In one implementation, client 503 makes a storage request to a domain name using HyperText Transport Protocol (HTTP), Secure HyperText Transport Protocol (HTTPS), File Transfer Protocol (FTP), or the like. The Internet Domain Name System (DNS) will resolve the storage request to a particular IP address identifying a specific storage node 215 that implements the SAM processes 401. Client 503 then directs the actual storage request using a mutual protocol to the identified IP address.

The storage request is directed using network routing resources to a storage node 215 assigned to the IP address. This storage node then conducts storage operations (i.e., data read and write transactions) on mass storage devices implemented in the storage node 215, or on any other storage node 215 that can be reached over an explicit or virtual private network 501. Some storage nodes 215 may be clustered as shown in the lower left side of FIG. 5., and clustered storage nodes may be accessible through another storage node 215.

Preferably, all storage nodes are enabled to exchange state information via private network 501. Private network 501 is implemented as a virtual private network over Internet 101 in the particular examples. In the particular examples, each storage node 215 can send and receive state information. However, it is contemplated that in some applications some storage nodes 215 may need only to send their state information while other nodes 215 act to send and receive storage information. The system state information may be exchanged universally such that all storage nodes 215 contain a consistent set of state information about all other storage nodes 215. Alternatively, some or all storage nodes 215 may only have information about a subset of storage nodes 215.

Another feature of the present invention involves the installation and maintenance of RAIN systems such as that shown in FIG. 5. Unlike conventional RAID systems, a RAIN system enables data to be cast out over multiple, geographically diverse nodes. RAIN elements and systems will often be located at great distances from the technical resources needed to perform maintenance such as replacing failed controllers or disks. While the commodity hardware and software at any particular RAIN node 105 is highly reliable, it is contemplated that failures will occur.

Using appropriate RAIN protections, data is spread across multiple RAIN nodes 105 and/or multiple RAIN systems as described above. In event of a failure of one RAIN element 215, RAIN node 105, or RAIN system, high availability and high reliability functionality can be restored by accessing an alternate RAIN node 105 or RAIN system. At one level, this reduces the criticality of a failure so that it can be addressed days, weeks, or months after the failure without affecting system performance. At another level, it is contemplated that failures may never need to be addressed. In other words, a failed disk might never be used or repaired. This eliminates the need to deploy technical resources to distant locations. In theory, a RAIN node 105 can be set up and allowed to run for its entire lifetime without maintenance.

RAIN nodes 105 desirably implement a "heartbeat" process that informs other RAIN nodes or storage management processes of their existence and their state of operation. For example, when a RAIN node 105 is attached to a network 214 or 215, the heartbeat message indicates that the RAIN node 105 is available, and notifies of its available storage. The RAIN node 105 can report disk failures that require parity operations. Loss of the heartbeat will result in reconstruction of an entire node at an alternate node. In a particular implementation, the heartbeat message is unicast to a single management node, or multicast or broadcast to a plurality of management nodes every several minutes or days. The broadcast may be scheduled at regular or irregular intervals, or may occur on a pseudorandom schedule. The heartbeat message includes information such as the network address of the RAIN node 105, storage capacity, state information, maintenance information and the like.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A data storage system comprising:
   a plurality of storage nodes;
   data storage mechanisms implemented in each storage node;
   a communication medium linking storage nodes; and
   data distributed across a set of the storage nodes selected based on state information corresponding to the storage nodes such that the data remains available irrespective of the unavailability of one or more of the storage nodes within the selected set, wherein the data storage mechanisms on at least two storage nodes collectively implement a unitary volume of network storage.

2. The data storage system of claim 1 wherein the communication medium comprises:
   a public network for receiving access requests for the data storage system; and
   a private network enabling communication between storage nodes.

3. The data storage system of claim 2 wherein the public network comprises the Internet.

4. The data storage system of claim 2 wherein the private network comprises a virtual private network implemented over the Internet.

5. The data storage system of claim 1 further comprising:
   communication processes implemented within each of the storage nodes operable to exchange state information between at least some of the other data storage nodes.

6. The data storage system of claim 1 wherein each of the data storage nodes further comprises data structures configured to store state information about one or more other nodes and the communication links between them.

7. The data storage system of claim 6 wherein the state information comprises information selected from the group consisting of but not limited to: availability information, capacity information, quality of service information, performance information, geographical location information, network topological location information.

8. The data storage system of claim 7 wherein the set of storage nodes is selected by a first of the storage nodes using the state information stored in the first of the storage nodes.

9. The data storage system of claim 1 wherein the network comprises:
   a plurality of first level networks, each first level network coupling multiple storage nodes; and
   a second level network coupling at least two of the first level networks.

10. The data storage system of claim 9 wherein the first level network comprises a connection selected from the group consisting of: Ethernet, fast Ethernet, gigabit Ethernet, Fibre channel, ATM, firewire, Myernet, SCSI, serial, parallel, universal serial bus, and wireless networks.

11. The data storage system of claim 1 further comprising:
    storage management processes executing on one of the storage nodes to determine state information about each of the set of storage nodes.

12. The data storage system of claim 1 wherein the communication medium comprises a secure communication medium.

13. The data storage system of claim 1 wherein the communication medium implements an authentication protocol between linked storage nodes.

14. The data storage system of claim 1 wherein the communication medium implements cryptographic security between linked storage nodes.

15. A data storage system comprising:
    a plurality of storage nodes wherein each of the data storage nodes further comprises data structures configured to store state information about one or more other nodes and the communication links between them;
    data storage mechanisms implemented in each storage node;
    a communication medium linking storage nodes;
    communication processes implemented within each of the storage nodes operable to exchange state information between at least some of the other data storage nodes;
    data distributed across a selected set of the storage nodes such that the data remains available irrespective of the unavailability of one or more of the storage nodes within the selected set; and
    wherein the communication processes implement a repetitive peer-to-peer conversation between the set of storage nodes enabling the state information contained in the state information data structures within each individual node to represent a consistent view of the state of the collection of storage nodes.

16. A method of managing data storage in a network comprising multiple storage nodes, the method comprising the acts of:
    communicating a storage request to at least one storage node;
    causing the at least one storage node to implement the storage request using an arbitrary subset of the storage nodes;
    communicating state information between the multiple storage nodes; and
    selecting the arbitrary subset of the multiple storage nodes to be used based upon the state information.

17. The method of claim 16 wherein the act of implementing the storage request comprises associating error checking and correcting (ECC) code with storage request.

18. The method of claim 17 wherein the ECC code is stored in a single network storage node and the unit of data is stored in two or more network storage nodes.

19. The method of claim 16 further comprising:
retrieving a stored unit of data specified by the storage request; and
verifying the correctness of the stored unit of data;
upon detection of an error in the retrieved unit of data, retrieving the correct unit of data using data stored in the others of the arbitrary subset of the multiple storage nodes.

20. The method of claim 16 further comprising moving the stored unit of data from one network storage node to another network storage node after the step of storing.

21. The method of claim 16 further comprising:
communicating state information and storage requests amongst the arbitrary subset of the storage nodes; and
encrypting at least some of the information and storage requests before communicating them between storage nodes.

22. The method of claim 16 further comprising:
communicating state information and storage requests amongst the arbitrary subset of the storage nodes; and
authenticating the communication between storage nodes.

23. A method of managing data storage in a network comprising multiple storage nodes, the method comprising:
communicating a storage request to at least one storage node;
causing the at least one storage node to implement the storage request using an arbitrary subset of the storage nodes;
attempting to retrieve the stored unit of data from the arbitrary subset of the multiple storage nodes;
detecting unavailability of one or more network storage nodes; and
in response to detected unavailability, retrieving the correct unit of data using data stored in others of the arbitrary subset of the multiple storage nodes.

24. The method of claim 23 wherein the unavailability is caused by failure of one or more of the network storage nodes.

25. The method of claim 23 wherein the unavailability is caused by congestion/failure of a network link leading to one or more of the network storage nodes.

26. A system for managing data storage in a network comprising multiple storage nodes, comprising:
means for communicating a storage request to at least one storage node;
means for causing the at least one storage node to implement the storage request using an arbitrary subset of the storage nodes;
means for communicating state information between the multiple storage nodes; and
means for selecting the arbitrary subset of the multiple storage nodes to be used based upon the state information.

27. The system of claim 26, further comprising:
means for retrieving a stored unit of data specified by the storage request; and
means for verifying the correctness of the stored unit of data; and
upon detection of an error in the retrieved unit of data, means for retrieving the correct unit of data using data stored in the others of the arbitrary subset of the multiple storage nodes.

28. A system for managing data storage in a network comprising multiple storage nodes, the method comprising:
means for communicating a storage request to at least one storage node;
means for causing the at least one storage node to implement the storage request using an arbitrary subset of the storage nodes;
means for attempting to retrieve the stored unit of data from the arbitrary subset of the multiple storage nodes;
means for detecting unavailability of one or more network storage nodes; and
in response to detected unavailability, means for retrieving the correct unit of data using data stored in others of the arbitrary subset of the multiple storage nodes.

29. The system of claim 28, wherein the unavailability is caused by failure of one or more of the network storage nodes.

30. The system of claim 28, wherein the unavailability is caused by congestion/failure of a network link leading to one or more of the network storage nodes.

* * * * *